United States Patent [19]

Casey et al.

[11] Patent Number: 4,810,769
[45] Date of Patent: Mar. 7, 1989

[54] PROCESS OF PREPARING POLYURETHANES CURED WITH 2,6-IDAMINOBENZOIC ACID DERIVATIVES AND BLENDS OF THE 2, 4 AND 2,6 ISOMERS

[75] Inventors: Jeremiah P. Casey, Emmaus; Susan M. Clift, North Wales; Barton Milligan, Coplay, all of Pa.

[73] Assignee: Air Products and Chemicals, Inc., Allentown, Pa.

[21] Appl. No.: 58,439

[22] Filed: Jun. 5, 1987

[51] Int. Cl.⁴ .................. C08G 18/14; C08G 18/10; C08G 18/32
[52] U.S. Cl. .................. 528/64; 528/62; 528/60; 521/159
[58] Field of Search ............... 528/64, 60, 62; 521/159

[56] References Cited

U.S. PATENT DOCUMENTS

| | | | |
|---|---|---|---|
| 3,681,290 | 8/1972 | Meckel et al. | 528/66 |
| 3,794,621 | 2/1974 | Meckel et al. | 528/64 |
| 4,039,514 | 8/1977 | van Gulick | 528/80 |
| 4,054,556 | 10/1977 | van Gulick | 528/61 |
| 4,254,272 | 3/1981 | Chung et al. | 560/19 |
| 4,365,051 | 12/1982 | Chung et al. | 528/64 |
| 4,519,432 | 5/1985 | Schmidt et al. | 528/64 |
| 4,526,905 | 7/1985 | Lucast et al. | 528/64 |
| 4,529,746 | 7/1985 | Markovs et al. | 528/64 |
| 4,546,167 | 10/1985 | Chang | 528/64 |
| 4,549,007 | 10/1985 | Lin et al. | 528/64 |
| 4,587,275 | 5/1986 | Kopp et al. | 521/163 |
| 4,611,045 | 9/1986 | Ihrman | 528/64 |

Primary Examiner—Harold D. Anderson
Assistant Examiner—Dennis R. Daley
Attorney, Agent, or Firm—Russell L. Brewer; James C. Simmons; William F. Marsh

[57] ABSTRACT

The present invention relates to polyurethanes and a method for making polyurethanes by reacting an organic diisocyanate, a glycol having a molecular weight of 500–5000 and a derivative of 2,6-diaminobenzoic acid or a blend comprising derivatives of 2,4-diaminobenzoic acid and 2,6-diaminobenzoic acid. The addition of the 2,6-diaminobenzoic acid derivative to the composition improves polyurethane processability and performance by decreasing chain extender reactivity and increasing hard segment regularity.

13 Claims, 1 Drawing Sheet

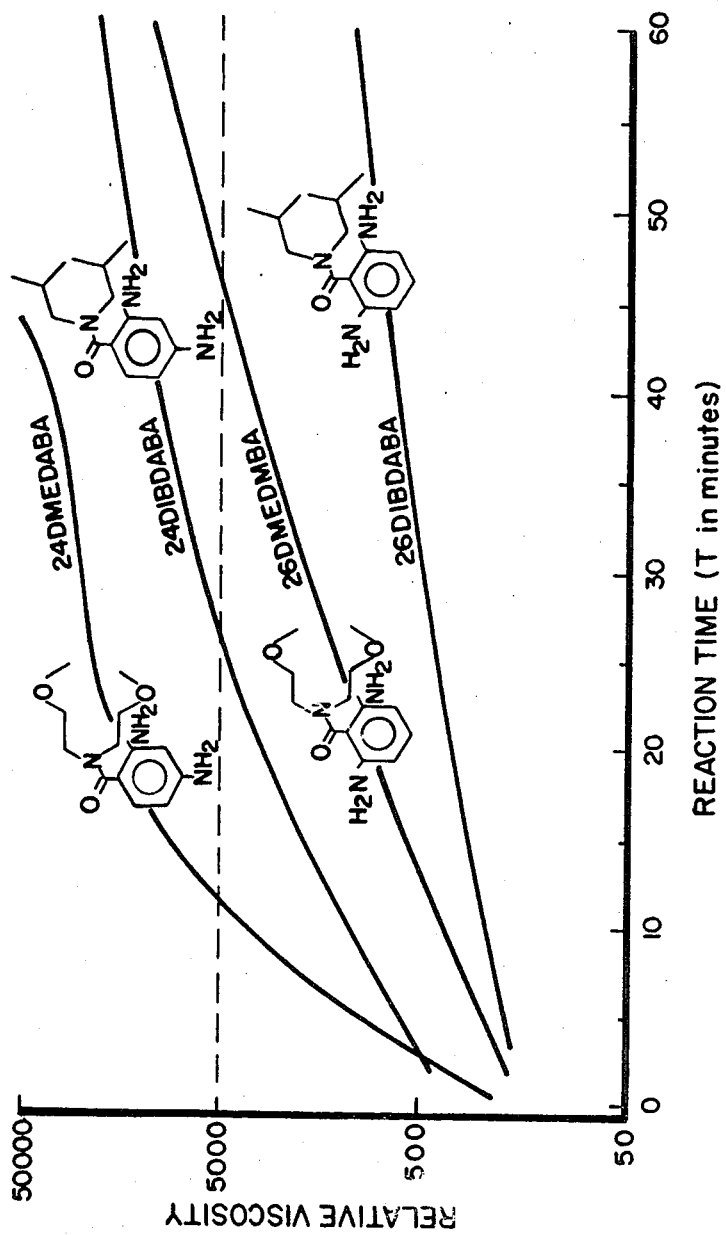

PROCESS OF PREPARING POLYURETHANES CURED WITH 2,6-IDAMINOBENZOIC ACID DERIVATIVES AND BLENDS OF THE 2, 4 AND 2,6 ISOMERS

TECHNICAL FIELD

The present invention relates to a polyurethane composition and a process or method for producing the same by reacting an organic diisocyanate, a glycol having a molecular weight of 500–5000 and a derivative of 2,6-diaminobenzoic acid or a bland of derivatives of 2,4-diaminobenzoic acid and 2,6-diaminobenzoic acid.

BACKGROUND OF THE INVENTION

Several processes for the production of polyurethanes with high tear strength and softness and the polyurethanes themselves are known in the prior art. Among these are the following.

U.S. Pat. Nos. 4,054,556 and 4,039,514 disclose polyurethane/polyurea compositions comprising the reaction products of an organic diisocyanate, a glycol having a molecular weight of 500–5000 and a derivative of 2,4-diaminobenzoic acid selected from $C_1$–$C_8$ alkyl and substituted alkyl esters, amides, alkyl substituted amides, anilides, substituted anilides, nitriles and mixtures thereof.

U.S. Pat. No. 4,587,275 discloses polyurethane urea elastomers produced by reacting polyisocyanates with compounds containing at least two isocyanate reactive hydrogen atoms having a molecular weight of 400–10,000 and mononuclear or dinuclear aromatic diamines. These aromatic diamines must have at least one sulfonamide group as a substituent on at least one of their aromatic rings. Known chain lengthening agents, activators, blowing agents, auxiliary agents and additives may also be included in the reaction mixture. Polyurethane elastomers produced by this process have excellent mechanical properties, especially, being soft yet highly tear resistant.

U.S. Pat. No. 4,254,272 discloses substituted aromatic diamines and polyurethantes cured thereby. The diamines are selected from 3,5-diamino4-tert-alkylbenzoates, 3,5-diamino-4-tert-alkylbenzonitriles and alkylene bis(3-amino-4-tert-alkylbenzoate).

U.S. Pat. No. 4,365,051 discloses a polyurethane cured by a diamine selected from cyclohexyl or phenyl 3,5-diamino-4-tert-alkylbenzoates, 3,5-diamino-4-tert-($C_4$–$C_6$ alkyl)-benzonitriles and alkylene bis(3-amino-4-tert-alkylbenzoate).

U.S. Pat. No. 3,681,290 discloses the preparation of polyurethanes cured by aromatic diamine containing ester groups wherein the amino groups are in the meta and/or para position(s) relative to the ester group, and with a substituent in the ortho position to at least one amino group.

U.S. Pat. No. 3,794,621 discloses polyurethane elastomers and a method for preparing them, wherein the polyurethane elastomers have structural units of the formula:

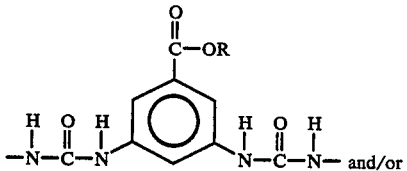

and/or

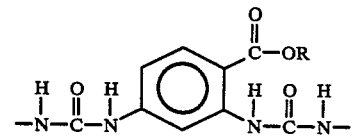

SUMMARY OF THE INVENTION

The present invention relates to a polyurethane formulation and process of preparation wherein a prepolymer comprising the reaction product of a glycol or a polymeric diol having a molecular weight of about 500–5000 and an organic diisocyanate is cured with a chain lengthening agent, the improvement comprising utilizing a curing chain lengthening agent comprising derivatives of 2,6-diaminobenzoic acid or a blend of derivatives of 2,6-diaminobenzoic acid and 2,4-diaminobenzoic acid.

BRIEF DESCRIPTION OF THE DRAWING

The single FIGURE of the drawing is a plot of rheological data for four polyurethanes prepared by curing with selected 2,4/2,6 isomer diamines.

DETAILED DESCRIPTION OF THE INVENTION

According to this invention it has been discovered that polyurethanes cured with 2,6-diaminobenzoic acid derivatives or a blend of 2,4-diaminobenzoic acid and 2,6-diaminobenzoic acid derivatives combine high tear strength and requisite softness. Also, the addition of the 2,6-diaminobenzoic acid derivative decreases chain extender reactivity, thus increasing pot-life working time, lowers the chain extender melting point and enhances the solubility in the polyol by retarding crystallization, thereby enhancing processability and improving polyurethane physical properties by increasing hard segment regularity.

The cured polyurethane with these properties is produced by initially reacting an organic diisocyanate with a glycol or diol (both terms being used interchangeably) having a molecular weight of about 500–5000 to form a prepolymer, then curing or chain extending the resulting prepolymer with a derivative of 2,6-diaminobenzoic acid selected from $C_1$–$C_8$ alkyl and substituted alkyl esters, amides, mono and di substituted alkyl amides, anilides, substituted anilides, and mixtures thereof. The organic diisocyanate and glycol are reacted at a temperature of about 50° to 110° C. for a period of about 0.5 to 10 hours thereby forming a prepolymer. The resulting prepolymer is a diisocyanate-capped diol.

The prepolymer is then cured with at least a derivative of 2,6-diamonobenzoic acid; appropriate derivatives will be subsequently specified. The curing takes place at a temperature of 20° to 150° C. for a period of several minutes to several days. The curing is carried out in a closed cavity, with or without pressure, by standard techniques; it is, of course, important to exclude atmospheric moisture.

In more detail, the instant invention pertains to a method for producing improved polyurethane/polyurea compositions. Initially, an organic diisocyanate is reacted with a glycol to form a prepolymer. The organic diisocyanate may be aromatic, aliphatic and/or cycloaliphatic with aromatic diisocyanate being preferred. Broadly, $C_8$-$C_{25}$ aromatic and $C_2$-$C_{18}$ aliphatic and $C_5$-$C_{25}$ cycloliphatic diisocyanates may be utilized. Arylene diisocyanates, i.e., those in which each of the two isocyanate groups is attached directly to an aromatic ring, are preferred. Examples of useful diisocyanates include tolylene-2,4-diisocyanate, 4-methoxy-1,3-phenylene- diisocyanate, 4-isopropyl-1,3-phenylenediisocyanate, 4-chloro-1,3-phenylenediisocyanate, 4-butoxy-1,3-phenylenediisocyanate, 2,4-diisocyanatodiphenylether, mesitylene diisocyanate, durylene diisocyanate, 4,4'-methylene-bis(phenylisocyanate), 1,5-naphthalene diisocyanate, p,p'-biphenyl diisocyanate, o-nitro-p,p'-biphenyl diisocyanate, 4,4'-diisocyanatodibenzyl, 1,4-tetramethylene diisocyanate, 1,6-hexamethylene diisocyanate, 1,10-decamethylene diisocyanate, 1,4-cyclohexylene diisocyanate, xylene diisocyanate, 4,4'-methylene-bis(cyclohexyl isocyanate), 1,5-tetrahydronaphthalene diisocyanate and m- or p-phenylenediisocyanate. Tolylene diisocyanate, both 2,4- and mixtures of the 2,4- and 2,6-isomers, is preferred.

The diisocyanate as mentioned previously, is reacted with glycol to form the prepolymer; the glycols have a molecular weight of about 500–5000. Several different types of glycols may be utilized, for instance, those derived from saturated and unsaturated polyhydrocarbons, polychloroprene, polyformals, polyalkylene ethers, polyesters, etc. Preferred are polyalkylene ether glycols or polyester glycols. The preferred polyalkylene ether glycols have the general formula $HO(RO)_nH$ wherein R is an alkylene radical of about $C_2$-$C_{10}$ which need not necessarily be the same in each instance. Representative glycols include polyethylene ether glycol, polypropylene ether glycol, polytrimethylene ether glycol, polytetramethylene ether glycol, polypentamethylene ether glycol, polydecamethylene ether glycol, and poly-1,2-dimethylene ether glycol. Mixtures of two or more polyalkylene ether glycols may be employed if desired.

The following polyester glycols may be utilized: Polyester glycols prepared by the polymerization of cyclic lactones such as $\epsilon$-caprolactone capped with diols or by the condensation polymerization of a dicarboxylic acid or its condensation equivalent and a molar excess of an organic polyol, representative diacids being succinic, glutaric and adipic acids and representative organic polyols being ethylene glycol, propylene glycol, 1,3-butanediol, 1,4-butanediol, 1,6-hexanediol, neopentyl glycol, and mixtures thereof. Adipates of lower alkyl polyols are preferred.

The isocyanate and the glycol are reacted at a temperature of about 50° to 110° C., preferably about 70° to 90° C. The reaction takes place over a period of about 0.5 to 10 hours, preferably about 1 to 5 hours. The mole ratio of isocyanate to glycol is about 1–2.5 NCO/OH, preferably about 1.5–2.2.

The resulting prepolymer is then cured with at least a derivative of 2,6-diaminobenzoic acid; the curing agent can be the 2,6-diaminobenzoic acid derivative alone or in combination with a 2,4-diaminobenzoic acid derivative. The derivatives which may be utilized are selected from $C_1$-$C_8$ alkyl and substituted alkyl esters, amides, mono and di substituted alkyl amides, anilides, substituted anilides, and mixtures thereof. More specifically, the 2,6-diamino compound may be defined as having the general formula:

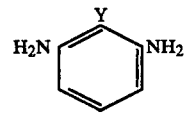

wherein
(a) $Y = CO_2R_1$
  $R_1 = C_1$-$C_8$ alkyl which may contain OH or ether groups or
(b) $Y = CONR_2R_3$
  $R_2$, $R_3 = R_1$, H, or aryl ($C_6$-$C_{12}$), or $R_2$ and $R_3$ be part of a 5 to 7 membered ring which may contain hetero atoms such as O or N (i.e. $-CH_2CH_2OCH_2CH_2-$)

The preferred derivatives of 2,6-diaminobenzoic acid which may be utilized depend on the hardness desired in the finished product. For a soft product, formula (a) wherein $R_1 = C_1$-$C_4$ alkyl is most preferred. For a medium product, formula (b) wherein $R_2 = H$ or $R_3$ and $R_3 = C_1$ to $C_4$ alkyl is most preferred, and for a hard product, formula (b) wherein $R_2 = H$ and $R_3 = C_6$-$C_{12}$ aryl is most preferred.

The diamine chain extender and the prepolymer are reacted at a temperature of about 20° to 150° C., preferably about 80° to 120° C. The reaction takes place over a period of about several minutes to several days, preferably about 4 to 20 hours. At the end of this time a vulcanized polyurethane product is recovered. Vulcanizate physical properties depend on the curing agent used. The mole ratio of diamine curing agent or chain extender to prepolymer during the reaction is usually between 0.8 and 1.2, preferably about 0.9 to 1.0.

The resulting cured products have many varied applications. They include the following: soft foams, low speed tires, typewriter roll covers and printing plates.

The following examples will better illustrate the nature of the present invention, in particular, the preparation of polyurethanes with 2,6-; 2,4- and 2,4-/2,6-diaminobenzoic acid derivatives; however, the invention is not intended to be limited to these examples.

CHAIN EXTENDER PREPARATION

The following examples illustrate the preparation of 2,6-, 2,4-, and 2,4/2,6- diaminobenzamide derivatives. cl EXAMPLE 1

To a slurry of 106.5 g of 2,6-dinitrobenzoic acid in 1000 ml of toluene was added with stirring 133.2 g of diisobutylamine. Next 44.9 g of phosphorus oxychloride was added dropwise at such a rate to maintain the temperature below 40° C. The mixture was heated to 50° C. for 12 hrs and poured into 500 ml of aqueous 5% NaHCO3 solution with stirring. The organic layer was separated, washed with 500 ml water, and the toluene removed under reduced pressure. The remaining solid was recrystallized from hot ethanol to give 105.2 g of N,N-diisobutyl-2,6-dinitrobenzamide, a yellow solid, mp 97°–99° C.

A two liter autoclave was charged with 72.5 g of diisobutyl-2,6-dinitrobenzamide, 1300 ml of methanol and 3.1 g of a 5% palladium on carbon/50% water catalyst. The mixture was hydrogenated at 800 psi hydrogen pressure while maintaining the temperature between 60°-100° C. Hydrogen uptake ceased after 30 min. The mixture was cooled, filtered, and the methanol removed at reduced pressure. The residue was crystallized from benzene/heptane to give 35.4 g of N,N-diisobutyl-2,6-diaminobenzamide, a white solid, mp 76°-77° C.

The following 2,6-diaminobenzamides are obtained in an analogous manner:

(b) N-(2,6-diaminobenzoyl)morpholine, mp 154°-155° C.

(c) N,N-bis(2-methoxyethyl)-2,6-diaminobenzamide, mp 66°-67° C.

EXAMPLE 2

To a slurry of 212.0 g of 2,4-dinitrobenzoic acid in 900 ml of toluene were added with stirring 101.0 g of triethylamine, followed by 159.6 g of bis(2- methoxyethyl)amine. Next 75.7 g of phosphorus oxychloride was added dropwise at such a rate to maintain the reaction temperature below 90° C. The mixture was refluxed for 5 hrs, cooled to 80° C., and poured slowly into 1000 ml of aqueous 5% NaHCO₃ solution with stirring. The precipitate was filtered, washed with water and recrystallized from hot methanol to yield 250.7 g of N,N-bis(2-methoxyethyl)-2,4-dinitrobenzamide, mp 89° C. An additional 19.0 g of material was recovered from the toluene filtrate.

A two liter autoclave was charged with 65.0 g of N,N-bis(2-methoxyethyl)-2,4-dinitrobenzamide, 1000 ml of methanol and 2.7 g of a 5% palladium on carbon/50% water catalyst. The mixture was hydrogenated at 800 psi hydrogen pressure while maintaining the temperature between 60°-100° C. Hydrogen uptake ceased after 30 min. The mixture was cooled, filtered, and the methanol removed at reduced pressure to give 53.2 g of N,N-bis(2-methoxyethyl)-2,4-diaminobenzamide, a red-brown viscous liquid.

The following 2,4-diaminobenzamides are obtained in an analogous manner:

(b) N-(2,4-diaminobenzoyl)morpholine, mp 114°-115° C.

(c) N,N-diisobutyl-2,4-diaminobenzamide, mp 94°-95° C.

EXAMPLE 3

A two liter autoclave was charged with 141.6 g of N,N-bis(2-methoxy ethyl)-2,4-dinitrobenzamide, 9.0 g of N,N-bis(2-methoxyethyl)-2,6-dinitro benzamide, 7.9 g of a 5% palladium/50% water catalyst, and 1200 ml of methanol. The mixture was hydrogenated at 800 psi hydrogen pressure while maintaining the temperature between 50°-100° C. Hydrogen uptake ceased after 20 min. The mixture was cooled, filtered, and the methanol removed at reduced pressure to yield 124.6 g of 94:6 2,4/2,6-N,N-bis(2-methoxyethyl) diaminobenzamide, a red-brown viscous liquid.

ELASTOMER PREPARATION AND PHYSICAL PROPERTY DATA

Hand cast elastomer plaques were prepared by mixing the chain extender with Adiprene 167, a 2,4-TDI-terminated 1000 molecular weight polytetramethyleneglycol available from Uniroyal, at elevated temperature, molding at 100° C. and 24,000 psi until adequate green strength, and curing at 100° C. for 24 hrs. Elastomers made with the more symmetrical 2,6 isomer show incrased tear resistance and tensile strength when compared to their 2,4 analogs. Results are listed in Tables I and II.

TABLE I

Cast Polyurethane Elastomers From Adp-L167 Prepolymer (NCO Index = 1.05)

| Chain Extender: | 24DMEDABA | 26DMEDABA |
|---|---|---|
| 2,4/2,6 isomer ratio | 100/0 | 0/100 |
| Shore A Hardness | 90 | 94 |
| Shore D Hardness | 41 | 50 |
| 100% tensile (psi) | 570 | 1680 |
| 200% tensile (psi) | 910 | 2070 |
| 300% tensile (psi) | 1400 | 2540 |
| Break tensile (psi) | 3660 | 3250 |
| % elongation | 610 | 460 |
| Tear resistance (pli) | 160 | 370 |

TABLE II

Cast Polyurethane Elastomers From Adp-L167 Prepolymer (NCO Index = 1.05)

| Chain Extender | 24DIBDABA | 24/26 DIBDABA | 26DIBDABA |
|---|---|---|---|
| 2,4/2,6 isomer ratio | 100/0 | 89/11 | 0/100 |
| Shore A Hardness | 92 | 92 | 93 |
| Shore D Hardness | 42 | 43 | 46 |
| 100% tensile (psi) | 960 | 890 | 1470 |
| 200% tensile (psi) | 1650 | 1580 | 2230 |
| 300% tensile (psi) | 2580 | 2660 | 3430 |
| Break tensile (psi) | 4390 | 4630 | 4690 |
| % elongation | 480 | 460 | 410 |
| Tear resistance (pli) | 210 | 390 | 330 |

DMEDABA — N,N—bis(2-methoxyethyl)-diaminobenzamide
DIBDABA — N,N—bis(diisobutyl)-diaminobenzamide
Test Methods
Tensile Strength (micro) ASTM D-412-83
Percent Elongation ASTM D-412-83
Tear Strength (Die C) ASTM D-624-81
Hardness ASTM D-2240-81

The following example illustrates preparation of the cast elastomers described above.

EXAMPLE 4

12.55 parts of N,N-diisobutyl-2,6-diaminobenzamide and 65.10 parts of Adiprene L-167 were heated separately to 85° C. and degassed. The two components were mixed together and poured into a two piece 6×6×⅛ in. mold. The mold was closed and pressed at 2400 lb. and 100° C. for 4 hrs. The elastomer was post cured at 100° C. for 12 hrs.

CHAIN EXTENDER REACTIVITY

Chain extender reactivity is measured using a polyurethane rheometer in a representative formulation consisting of two equivalents of toluenediisocyanate prepolymer, one equivalent of polyester diol and one equivalent of aromatic diamine. The isocyanate prepolymer is Adiprene L-167, a TDI-terminated 1000 molecular weight polytetramethyleneglycol available from Uniroyal. The diol is CAPA 200 from Interox, a polycaprolactone of 274 equivalent weight.

Aromatic diamine is dissolved in an isoequivalent of CAPA 200. Solid amines are melted under a protective nitrogen blanket, then mixed, to hasten dissolution. The amine/polyol blend is checked for homogeneity and stability at 50° C., then the correct weight is placed in a 35 mm deep, 20 mm i.e. cylindrical stainless steel cup. Alternatively, exact weights of amine and diol are added directly to the test cup instead of being made in a master batch. The correct weight of Adiprene L-167 thermostatted at 50° C. is carefully layered above the diol/diamine. The test cup is inserted into a thermostatted block, also at 50° C. Total weight of the 2:1:1 NCO prepolymer:diol:diamine mixture is 7.0 g.

Above the test cup in the polyurethane rheometer is a close fitting (19.5 mm o.d.) perforated plunger mounted by a removable key on a shaft driven at constant pressure by a reciprocating air motor. The plunger base is 6 mm thick with six radially distributed 2 mm holes extending through the base. At full stroke the plunger reaches the cup bottom; at the upper limit a teflon seal retains material in the cup. A series of 'O' rings cleans the shaft of formulation on each upstroke.

As each new plunger is mounted, its stroke rate is checked and calibrated against 'O' ring resistance. The normal set point is a 5 Hz stroke rate in an empty cup, requiring approximately 20 pounds pressure. Shaft movement is detected by magnetic sense switches at the top and bottom of the rheometer shaft and compared to a (Global Specialties Corp. model 4401) 1000 Hz frequency standard using a 24Kb Ohio Scientific C4PMF 8 bit microcomputer.

The reactivity test is started by triggering the pressure driven plunger using a contact switch which also starts a floppy disc-based operating program. As the components react, the formulation viscosity increases; the shaft stroke rate decreases. Time and computed relative viscosity, normalized to the 200 milisecond cycle time for a specific plunger, are displayed on a CRT monitor in real time and stored in microcomputer memory. Relative viscosity units may be correlated to actual viscosities by extended calibration.

In a test run individual cycles are first timed, averaged over a minimum period ($T_{min}$) and accumulated. After 80 data points have been recorded the array holding the data is compressed to 40 points and $T_{min}$ is doubled. This continues until the device is stopped or disabled by a program interrupt. BASIC software allows X-Y plotting of time-relative viscosity on the microcomputer CRT and assignment of run information such as sample name and notebook number. After each rheometer run, data are transferred via the Ohio Scientific RS-232 printer port to a PDP 11/44 minicomputer. Graphics displaying multiple run time-relative viscosity data may be produced on a lab VT-100 minicomputer terminal. A final level of data transmission is from minicomputer to corporate mainframe from which numerical lineshape analyses and graphics are generated.

A polynomial exponential model was chosen to best calculate rheometer lineshapes:

$$\text{relative viscosity} = e^{(I + A^*t + B^*t2 + C^*t3)}$$

The first order term, "A", measures initial reactivity. The higher order terms describe the more complex cohesive forces build-up in the final polymer. T/5000, the time at which the relative viscosity is 5000 units, is a single valued pot-life time that provides succinct, though only partial, reactivity comparisons among chain extenders in a specific test formulation.

Pot-life reactivity as measured by T/5000 increases with increasing 2,6-isomer content. This is shown by Tables III to V.

TABLE III

| Chain Extender | 24DMEDABA | 24/26DMEDABA | | 26DMEDABA |
|---|---|---|---|---|
| 2,4/2,6 isomer ratio | 100/0 | 94/6 | 91/9 | 0/100 |
| Pot-life T/5000 (min) | 11 | 16 | 21 | 45 |

TABLE IV

| Chain Extender | 24DIBDABA | 24/26DIBDABA | 26DIBDABA |
|---|---|---|---|
| 2,4/2,6 isomer ratio | 100/0 | 89/11 | 0/100 |
| Pot-life T/5000(min) | 29 | 45 | 136 |

TABLE V

| Chain Extender | 24DABM | 26DABM |
|---|---|---|
| 2,4/2,6 isomer ratio | 100/0 | 0/100 |
| Pot-life T/5000(min) | 9 | 11 |

DABM — N—(diaminobenzoyl)morpholine

The single figure of the drawing, illustrates the benefit of curing with the 2,6 isomers. As can be seen from the figure, the two polyurethanes prepared with the 2,6 diamine isomers have considerably longer reaction times compared with the two polyurethanes prepared with the 2,4 diamine isomers. The rate reduction is lessened when the side chain is conformationally constrained, witness the morpholine analog in Table V. These longer reaction times facilitate the use of the resultant polyurethanes in cast elastomer applications.

As stated earlier, U.S. Pat. Nos. 4,054,554 and 4,039,514 disclose polyurethanes cured with 2,4-diaminobenzoic acid derivatives, reporting that these polymers combine high tear strength with the softness needed for many applications. No mention is made of the 2,6-isomer. Addition of the 2,6-isomer improves polyurethane physical properties by increasing hard segment regularity, lowers the chain extender melting point, enhances polyol solubility, and increases pot-life working time. As a summary the benefit of adding the 2,6 isomer the following is offered.

Polyurethane cast elastomers cured with 2,6-diaminobenzoic acid derivatives show improved tensile and tear strength; increased hard segment regularity results from addition of the more symmetrical 2,6 isomer.

The more sterically congested 2,6-isomer is less reactive than its 2,4-analog. Isomer blend reactivity decreases with increasing 2,6 isomer content.

Blends of 2,4- and 2,6-diaminobenzoic acid derivatives retard crystallization from polyol solution, thereby increasing processability.

Addition of the 2,6-isomer lowers the chain extender melting point, increasing processability.

The present invention has been described with reference to specific embodiments thereof. However, these embodiments should not be considered a limitation on the scope of the invention, such scope should be ascertained by the following claims.

We claim:

1. In a process for the preparation of a polyurethane composition by curing a prepolymer comprising the reaction product of a glycol having a molecular weight of about 500–5000 and an organic diisocyanate with a chain lengthening agent, the improvement comprising a chain lengthening agent for curing said prepolymer which comprises derivatives of 2,6-diaminobenzoic acid having the general formula:

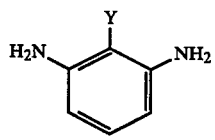

wherein Y is
(a) $Y=CO_2R_1$
(b) $Y=CONR_2R_3$ *and wherein* $R_1$ is a $C_1$–$C_8$ alkyl containing a hydroxy group or an ether group, and $R_2$ and $R_3$ are each selected from the group consisting of H, $R_1$ and $C_6$–$C_{12}$ aryl, and wherein $R_2$ and $R_3$ form a 5 to 7 membered ring which may contain an oxygen atom or a nitrogen atom.

2. The process of claim 1 wherein said 2,6-diaminobenzoic acid derivative is N-(2,6-diaminobenzoyl)morpholine.

3. The process of claim 1 wherein said 2,6-diaminobenzoic acid derivative is N,N-bis(diisobutyl)-2,6-diaminobenzamide.

4. The process of claim 1 wherein $R_1$ is a $C_1$–$C_4$ alkyl.

5. The process of claim 1 wherein $R_2$ is H or $R_1$ and $R_3$ is a $C_1$–$C_4$ alkyl.

6. The process of claim 1 wherein $R_2$ is H and $R_3$ is a $C_6$–$C_{12}$ aryl.

7. The process of claim 1 wherein said 2,6 diaminobenzoic acid derivative is N,N-bis(2-methoxyethyl)-2,6-diaminobenzamide.

8. The process of claim 1 wherein said 2,6 diaminobenzoic acid derivative is N,N-bis(diisobutyl)-2,6-diaminobenzamide.

9. In a process for the preparation of a polyurethane composition by curing a prepolymer comprising the reaction product of a glycol having a molecular weight of about 500–5000 and an organic diisocyanate with a chain lengthening agent, the improvement comprising a chain lengthening agent for curing said prepolymer which comprises derivatives of 2,4-diaminobenzoic acid and 2,6-diaminobenzoic acid wherein said 2,6-diaminobenzoic acid derivatives have the general formula:

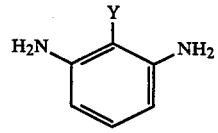

wherein Y is
(a) $Y=CO_2R_1$ or
(b) $Y=CONR_2R_3$ *wherein* $R_1$ is a $C_1$–$C_8$ alkyl containing a hydroxy group or an ether group, and $R_2$ and $R_3$ are each selected from the group consisting of H, $R_1$ and $C_6$–$C_{12}$ aryl, and wherein $R_2$ and $R_3$ form a 5 to 7 membered ring which may contain an oxygen atom or a nitrogen atom and said derivatives of 2,4-diaminobenzoic acid have the general formula:

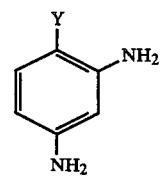

wherein Y is
(a) $Y=CO_2R_4$
or
(b) $Y=CONR_5R_6$ *wherein* $R_4$ is a $C_1$–$C_8$ alkyl containing a hydroxy or ether group, and $R_5$ and $R_6$ are each selected from the group consisting of H, $R_4$ and $C_6$–$C_{12}$ aryl, and wherein $R_5$ and $R_6$ form a 6 to 7 membered ring which may contain an oxygen atom or a nitrogen atom.

10. The process of claim 9 wherein said 2,6-diaminobenzoic acid derivative is N-(2,6-diaminobenzoyl)morpholine and said 2,4-diaminobenzoic acid derivative is N-(2,4-diaminobenzoyl) morphine.

11. The process of claim 9 wherein said 2,6-diaminobenzoic acid derivative is N,N-bis(diisobutyl)-2,6-diaminobenzamide and said 2,4-diaminobenzoic acid derivative is N,N-bis(diisobutyl)-2,4-diaminobenzamide.

12. The process of claim 9 wherein said 2,6 diaminobenzoic acid derivative is N,N-bis(2-methoxyethyl)-2,6-diaminobenzamide and said 2,4 diaminobenzoic acid derivative is N,N-bis(2-methoxyethyl)-2,4-diaminobenzamide.

13. The process of claim 9 wherein said 2,6 diaminobenzoic acid derivative is N,N-bis(diisobutyl)-2,6-diaminobenzamide and said 2,4 diaminobenzoic acid derivative is N,N-bis(diisobutyl)-2,4-diaminobenzamide.

* * * * *